(12) United States Patent
Harvey et al.

(10) Patent No.: US 7,137,781 B2
(45) Date of Patent: Nov. 21, 2006

(54) TURBINE COMPONENTS

(75) Inventors: Neil W Harvey, Derby (GB); Chi W J P Ling, Oxford (GB); Peter T Ireland, Oxford (GB)

(73) Assignee: Rolls-Royce plc, London (GB)

( * ) Notice: Subject to any disclaimer, the term of this patent is extended or adjusted under 35 U.S.C. 154(b) by 87 days.

(21) Appl. No.: 10/701,560

(22) Filed: Nov. 6, 2003

(65) Prior Publication Data
US 2004/0096313 A1    May 20, 2004

(30) Foreign Application Priority Data
Nov. 12, 2002  (GB) ................................ 0226291.3

(51) Int. Cl.
*F01D 5/18*    (2006.01)
*F01D 9/06*    (2006.01)

(52) U.S. Cl. ............... 416/96 A; 416/96 R; 416/97 R; 415/115

(58) Field of Classification Search ........ 415/115–116; 416/96 R, 96 A, 97 R
See application file for complete search history.

(56) References Cited

U.S. PATENT DOCUMENTS

| | | | |
|---|---|---|---|
| 3,373,970 A * | 3/1968 | Brockmann | 416/96 A |
| 4,505,639 A * | 3/1985 | Groess et al. | 416/97 R |
| 5,002,460 A | 3/1991 | Lee | |
| 5,603,606 A | 2/1997 | Glezer | |
| 6,874,988 B1 * | 4/2005 | Tiemann | 415/115 |

FOREIGN PATENT DOCUMENTS

| | | | |
|---|---|---|---|
| EP | 1197636 A | 4/2002 | |
| WO | WO-02/27146 A1 * | 4/2002 | 415/115 |

\* cited by examiner

*Primary Examiner*—Christopher Verdier
(74) *Attorney, Agent, or Firm*—W. Warren Taltavull; Manelli Denison & Selter PLLC

(57) ABSTRACT

A turbine component, such as a turbine blade 1, 21, has a coolant supply passage 4, 24 and a cooling chamber 3, 23 connected by an injection passage 5, 25. The cooling chamber 3, 23 includes flow guides in the form of vanes 7, 8 or grooves 37 which act to create a coolant flow in a spiral direction. Thus, there is limited coolant flow impingement and greater cooling effect to allow the turbine component to operate at higher temperatures.

27 Claims, 6 Drawing Sheets

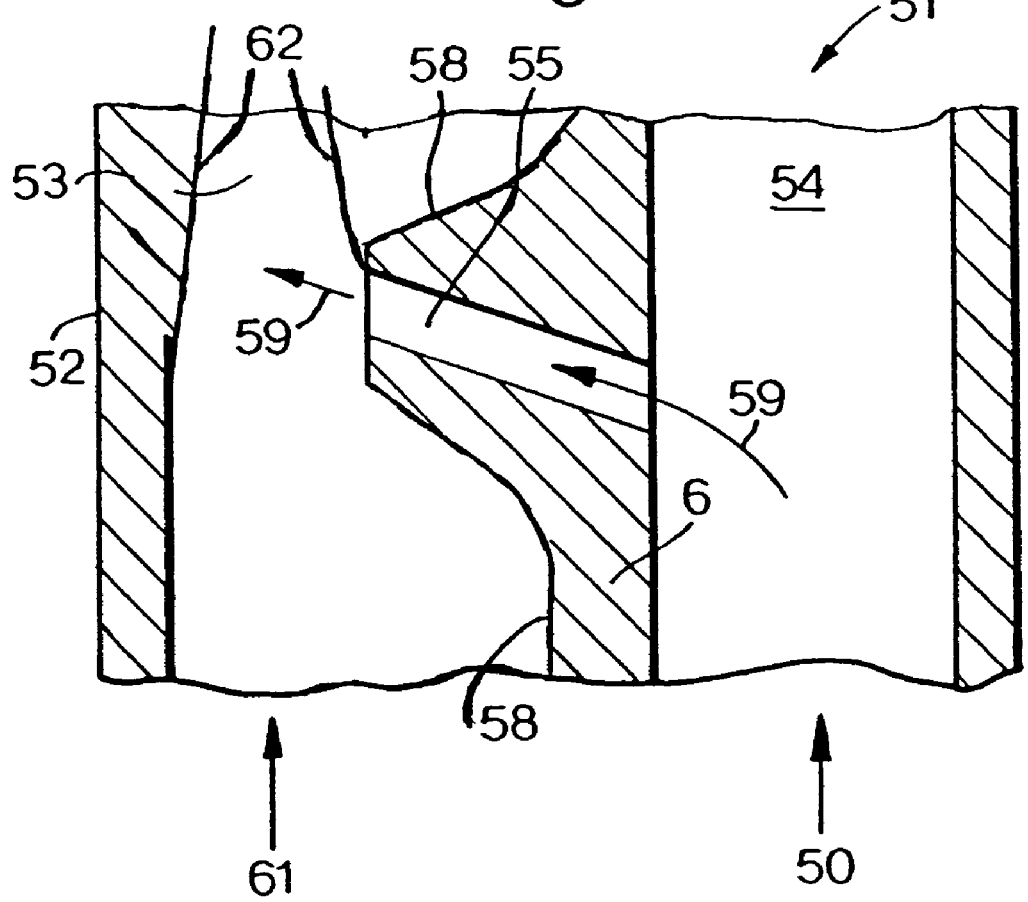

TURBINE COMPONENTS

FIELD OF THE INVENTION

The present invention relates to turbine components such as turbine blades and more particularly to appropriate cooling of such turbine components in service.

BACKGROUND OF THE INVENTION

Generally, it is necessary to provide internal cooling of turbine components. To achieve high performance it is desirable to utilise high turbine entry temperatures and so greater thermal efficiencies. Unfortunately, such high turbine entry temperatures are limited by inherent characteristics of the materials from which turbine blades and vanes are made. In such circumstances, internal cooling allows components made from available materials to operate at temperatures which exceed natural melting temperatures.

Cooling systems for turbine vanes and blades generally comprise providing a feed of cool air taken such that there is a positive pressure from the compressor system in a jet engine and feeding that cool air to the turbine blades through internal passages and chambers in order to effect cooling by a combination of internal convection and external film cooling. The present invention principally relates to internal convection cooling where a pressurised passage of coolant air as described previously incorporates a number of flow or injection cross passages to cooling chambers in the vane or blade in order to provide cooling. The cool air is forced into the cooling chambers or other passages of the blade or vane due to a pressure differential between the coolant supply passage and those cooling chambers. The cooler air presented within the chambers or other passages picks up heat by convection within the chamber or passage. The warmed air is then either exhausted through an outlet passage to an exhaust passageway or returned to the supply passage or possibly released through holes in the blade surface in order to provide film cooling on external surfaces of that blade or vane.

There is an objective to increase the degree of cooling possible with respect to components such as turbine vanes and blades in order that higher thermal efficiencies through higher input temperatures can be achieved whilst using available materials with a melting point below those input temperatures.

SUMMARY OF THE INVENTION

In accordance with the present invention there is provided a turbine component such as a blade or vane, the component comprising a coolant passage and a cooling chamber connected by an injection passage, the cooling chamber including flow guide means associated with the injection passage to cause flow in a spiral coolant flow path within the cooling chamber.

Normally, the spiral coolant path is adjacent a wall surface of the cooling chamber. Typically, the spiral coolant flow path is configured to ensure limited flow path impingement.

Preferably, the flow guide means are raised above the internal surface of the cooling chamber. Alternatively, the flow guide means may be provided by grooves formed in the surface of the chamber. Also, the flow guide means may be provided by extending the injection passage into the cooling chamber.

Typically, the flow guide means are provided immediately adjacent the injection passage. Possibly, a flow guide is provided only on one side of the injection passage. The flow guide means is provided only on the downstream side of the injection passage.

Possibly, the injection passage is angled relative to the coolant passage in order to facilitate coolant flow from that coolant passage in use into the cooling chamber.

Normally, the flow guide means are cast or moulded with the component on formation of that component. Alternatively, the flow guide means may be provided by inserts placed within each cooling chamber during assembly. Advantageously, the inserts are fixed relative to each injection passage. Possibly, the flow guide means may be specifically configured or formed from materials to enable an adjustment in the spiral coolant flow path dependent upon component temperature. Possibly, the injection passage dimensions may be varied to alter the volume of coolant flow taken from the coolant passage by altering the available cross-sectional area from the injection passage into the cooling chamber. The flow guide means is specifically configured, in terms of angular presentation, height relative to the injection passage and the extent of coverage of the internal surface of the cooling chamber by the flow guide means, to enable an adjustment in the volume of coolant flow taken from the coolant passage dependent upon component temperature by altering the available cross-sectional area from the injection passage into the cooling chamber. The flow guide means is formed from materials to enable an adjustment in the volume of coolant flow taken from the coolant passage dependent upon component temperature by altering the available cross-sectional area from the injection passage into the cooling chamber.

Typically, the flow guide means are angled relative to the injection passage connected to the cooling chamber. Normally, the flow guide means will be angled between 5° and 45° to the axis of the injection passage. Possibly, flow guide means may be presented at different angles to their respective injection passage at different parts of the cooling chamber to create different spiral coolant flow paths in those parts. Alternatively, the flow guide means may be uniformly angled relative to the axis of the injection passage throughout the component. The angle of presentation between the flow guide means and the axis of the injection passage may vary dependent upon temperature in order to alter the spiral coolant flow path.

Typically, the flow guide means will have a height of at least 20% of the width of the injection passage in the direction of the spiral flow path.

Possibly, the flow guide means may have different heights at different parts of the component. Alternatively, the flow guide means may have uniform heights throughout the component. Possibly, the flow guide means may have variable heights dependent upon temperature of the component.

Typically, the flow guide means will be formed around between 10% to 100% of the internal circumference surface of the chamber.

Advantageously, flow guide means may be provided on either side of the injection passage. Typically, these flow guide means on either side of the injection passage will be parallel with respect to each other. Alternatively, these flow guide means on either side of the injection passage may diverge relative to one another. Advantageously, that divergence is at least 5°. Typically, flow guide means either side of the injection passage will diverge such that one flow guide is at an angle of 20° to the axis of the injection passage whilst the other flow guide is at an angle of 25° to the axis of the injection passage.

Possibly, the flow guide means are shaped in order to enhance entrainment of spiral coolant flow. Possibly, the flow guide means are shaped by having an overhanging curve in order to entrain the coolant flow. Furthermore, the overhanging flow guide may have a receding helix edge extending from adjacent the injection passage.

Preferably, the cooling chamber has a tapering cross-section or is otherwise shaped from one end to the other in order to facilitate vortex strength as the coolant flow in the spiral flow path progresses along that chamber.

Possibly, the cooling chamber has a circular cross-section but other cross-sections are possible.

Also in accordance with the present invention there is provided an engine including a turbine component as described above.

BRIEF DESCRIPTION OF THE DRAWINGS

Embodiments of the present invention will now be described by way of example only with reference to the accompanying drawings in which:

FIG. 8 is a schematic plan view of the embodiment illustrated in FIG. 6 operating in a second configuration.

DETAILED DESCRIPTION OF THE INVENTION

Figure 1:
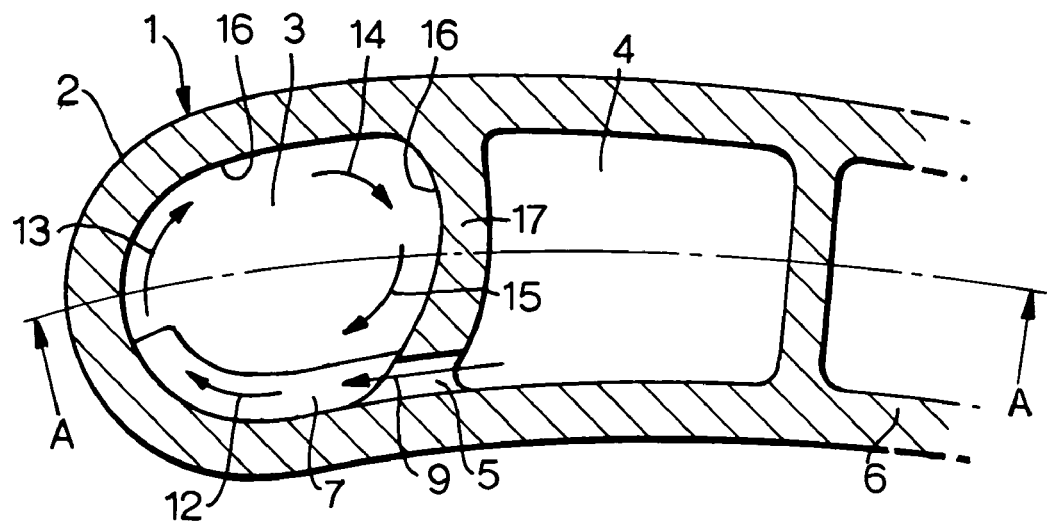
FIG. 1 is a schematic part cross-section of a portion of a turbine component in accordance with a first embodiment of the invention.
Figure 2:
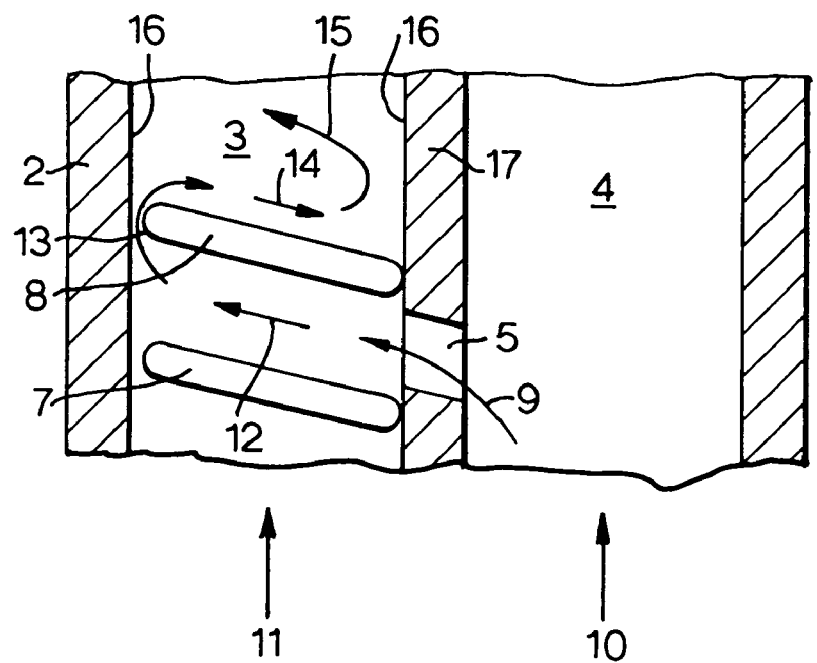
FIG. 2 is a schematic part plan cross-section of a part of a turbine component in accordance with the first embodiment and consistent with that depicted in FIG. 1 in the direction A—A.

FIGS. 1 and 2 illustrate a first embodiment of a turbine component in accordance with the present invention. The turbine component depicted is a turbine blade 1 having a leading edge 2 within which a cooling chamber 3 is formed. A coolant passage 4 is provided such that pressurised coolant, normally air, is forced through pressure differential through a connecting injection passage 5 into the chamber 3. The chamber 3 and passage 4 as depicted in the figures extend longitudinally into the blade 1. Walls 6 define the respective chambers 3 and passages 4. The present description is directed to a chamber 3 located towards the leading edge 2 of the blade 1 but other chambers and passages within a turbine component could also be cooled in accordance with the present invention.

In the first embodiment of the present invention depicted in FIGS. 1 and 2 guide vanes 7, 8 are provided such that a coolant flow depicted as arrow head 9 is driven by pressure differential from the coolant supply passage 4 into the chamber 3 and is (guided by the guide vane 7, 8 in order to create flow in a spiral coolant flow path within the chamber 3. The spiral coolant flow path is propagated or initiated by angular presentation of the guide vane 7, 8 to the injection passage 5. Typically, as depicted in FIG. 2 two guide vanes 7, 8 are provided in order to create flow in the spiral coolant flow path but it will be appreciated that a single guide vane 7 could be provided to initially stimulate spiral coolant flow but with some diminution in flow entrainment.

Normally, the guide vanes 7, 8 will be moulded or cast with the turbine component or blade 1 in an appropriate orientation in order to stimulate flow in the spiral coolant flow path as required by the present invention. Alternatively, the guides vanes 7, 8 could be specifically inserted within the chamber 3 at appropriate locations in order to provide the spiral coolant flow entrainment as required by the present invention.

FIG. 2 is a schematic cross-section in the direction of A—A taken from FIG. 1 and shows a part of the blade 1 about an injection passage 5. As can be seen, a coolant air flow in the coolant passage 4 occurs in the direction of arrow head 10 such that through pressure differential the coolant air flow 9 is forced through the injection passage 5 into the cooling chamber 3. As indicated previously, the guide vanes 7, 8 act upon the air forced through the passage 9 in order to create a spiral air flow path as a vortex which passes along the chamber 3 in the direction of arrow head 11. By such means the air flow within the chamber 3 circulates in broad bands in the direction of arrow heads 12, 13, 14, 15 along the length of the chamber 3. The coolant air flow in the vortex created by the spiral flow is therefore in relatively close passing contact with interior surfaces 16 of the chamber 3. The coolant air flowing in the direction of arrow heads 12 to 15 will thereby draw heat energy from the blade 1 in order to cool it by convective heat transfer. Coolant air passing through the injection passage 5 will thereby be warmed within the chamber 3 and the warmed air then released or otherwise removed from the chamber 3 to render the component 1 cooler.

It will be noted that it is important that the coolant air flow in the spiral or vortex defined by arrow heads 12 to 15 progresses along the chamber 3 in the direction of arrow head 11 such that there is limited radial or circumferential clash or other impingement between coolant air flows as that air flow progresses along the chamber 3. By clash or impingement is meant overlap between side-by-side bands of coolant flow. Without the guide vanes 7, 8, and particularly if the injection passage is perpendicular to the coolant passage, it will be understood that due to the projection pressure created by the pressure differential between the passage and the cooling chamber the coolant air flow would tend to follow the direct flow path around the interior surface of the chamber 3 and so not progress along the chamber 3 in the direction of arrow head 11. Thus, there would be direct impingement between air projected initially through the injection passage and that circulated within that chamber with the result that the returning and warmed air flow would "lift off" inwardly within the chamber with reduced thermal efficiency and therefore cooling. Provision of an angled injection passage may be difficult due to the necessity then to provide an acceptable injection passage width to length for coolant flow entrainment and projection in order to create the desired spiral coolant flow direction. It will be appreciated that weight and balance within the turbine component are important and increasing the thickness of walls 17 in order to achieve a necessary injection passage length may not be acceptable. It is desirable for the injection passage 5 to be angled in association with the guide vanes 7, 8 in order to initiate projection entrainment from the passage 5 under the pressure differential from the supply coolant passage 4 to the cooling chamber 3 projects a jet of coolant air towards the vanes 7, 8.

Figure 3:
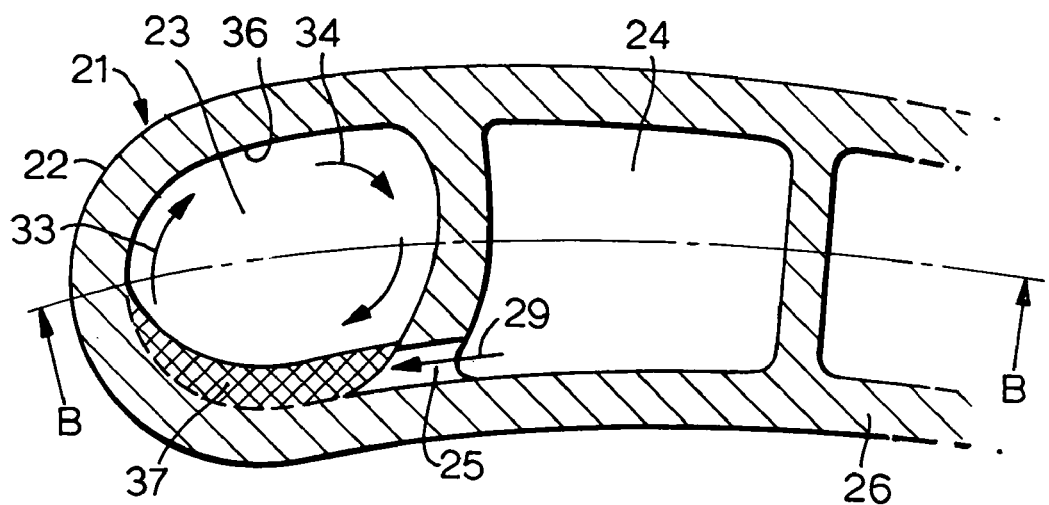
FIG. 3 is a schematic part cross-section of a portion of a turbine component in accordance with a second embodiment of the invention.
Figure 4:
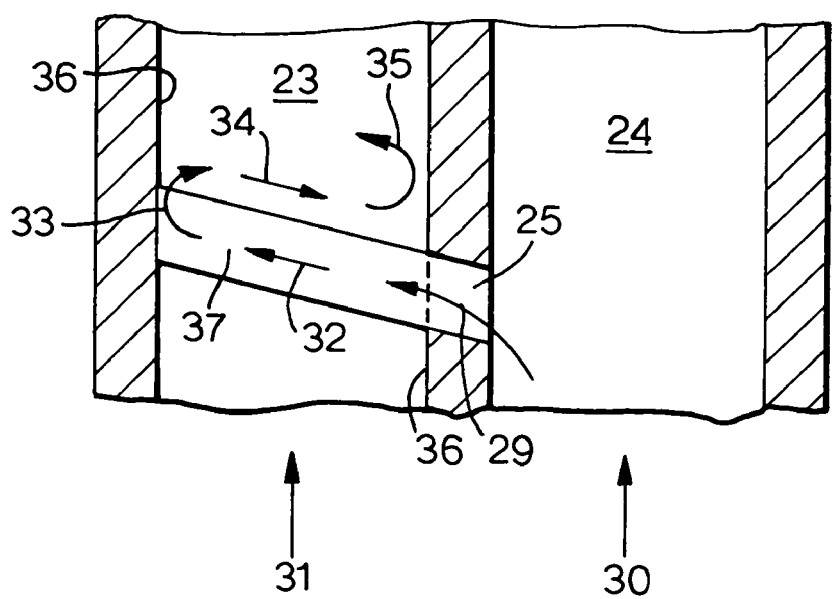
FIG. 4 is a schematic part plan cross-section of part of a turbine component in accordance with the second embodiment and consistent with that depicted in FIG. 3 in the direction B—B.

FIGS. 3 and 4 illustrate a second embodiment of the present invention.

FIG. 3 is a schematic cross-section of a component and FIG. 4 is a part plan schematic in the direction B—B from FIG. 3. Thus, a turbine component such as a turbine blade 21 includes a leading edge 22 along with a cooling chamber 23 and a coolant passage 24. An injection passage 25 connects the cooling chamber 23 and the coolant passage 24 such that through a pressure differential, coolant such as air is forced through the passage 25 into the cooling chamber 23. The blade 21 is formed from a number of chambers and passages with dividing walls 26 utilised to define these chambers and passages whilst ensuring acceptable mechanical strength and stability for the blade 21.

Within the chamber 23 an internal surface 36 includes a groove 37. Thus, an air flow defined by arrow head 29 is entrained by the groove 37 in order to create a spiral coolant flow path defined by arrow heads 32 to 35. This spiral coolant flow path creates a vortex within the chamber 23 which moves progressively along that chamber 23 in the direction of arrow head 31 in order to pick up heat energy from contact with the inner surface 36 of that chamber. The warmed air is exhausted or otherwise removed in order to render the component or blade 21 cooler.

Coolant air flow within the coolant passage 24 is in the direction of arrow head 30 and again the injection passage 25 is typically angled relative to the axis of that passage 24 in order to facilitate entrainment of air flow (arrow head 29) into the guide groove 37.

Typically, the guide groove 37 is cast or moulded with the turbine components or blade 21 during manufacture.

As indicated previously, the spiral coolant flow path defined by arrowheads 32 to 35 ensures that there is no circumferential clash or impingement between coolant flows around the chamber 23. In such circumstances, cooling of the chamber 23 is more efficient and less localised about the injection passage 25.

Figure 2A:
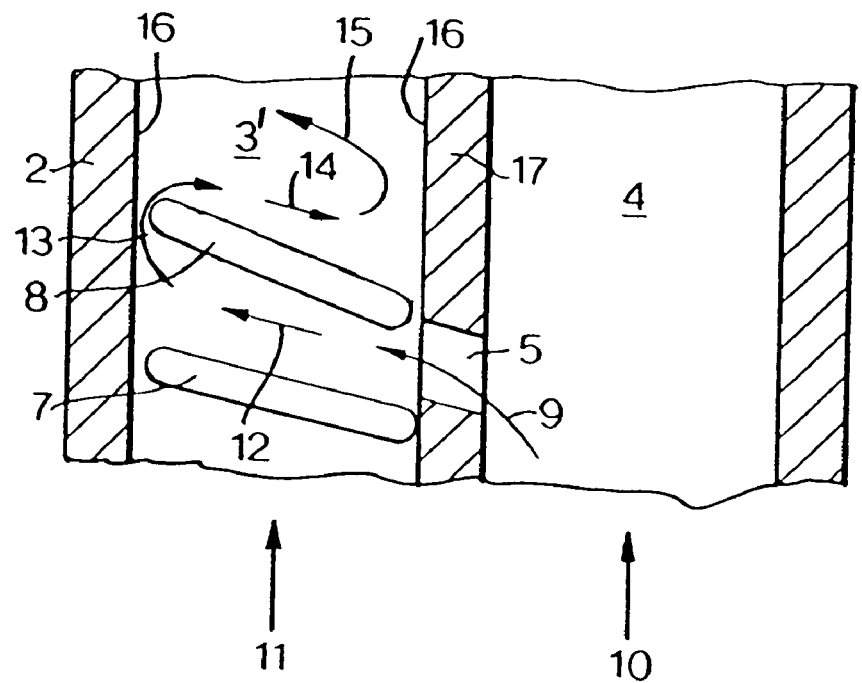
FIG. 2A is a schematic plan view of the embodiment illustrated in FIG. 2 operating in a second configuration.
Figure 7:
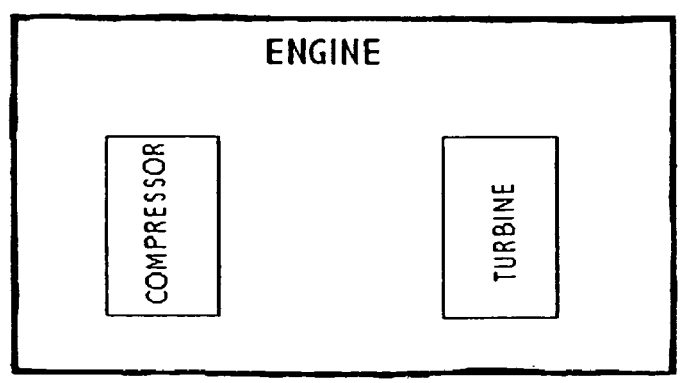
FIG. 7 is a perspective view of an engine including a turbine and a compressor in accordance with the present invention.

As indicated above, the flow guides whether constituted by vanes 7, 8 or groove 37 are configured in order to initially entrain and therefore propagate spiral flow within the cooling chamber 3 or 23. In such circumstances, the vanes 7, 8 or groove 37 will be defined by a number of factors including the relative height or depth of the vanes 7, 8 or groove 37 compared to the width of the injection passage 5, 25 along with the angle of presentation relative to the coolant injection flow direction and the proportion of the interior surface 16, 36 of the cooling chamber 3, 23 covered by the flow guides. Typically, the height or depth of the guide will be in the order of 20% to 200% of the slot width of the injection passage 5, 25 with the height typically dependant upon the desired level of entrainment in comparison with the increased weight and altered mass distribution within the turbine component. Generally, the flow guides formed by the vanes 7, 8 or groove 38 will lie at an angle of 5° to 45° to the axis of the chamber 3', 23 or passage 4, 24 as shown in FIG. 2A. It will be understood that this angle essentially defines the pitch distance of the spiral flow direction and will depend upon the expected coolant flow rate, degree of cooling required and extent of flow entrainment provided by the vanes 7, 8 or groove 37 due to height or depth relative to the width of the injection passage. Clearly, it is possible to provide flow guides which extend as a complete entrainment spiral along the length of the cooling chamber and so ensure complete spiral coolant flow control with the exception of leakage into the relatively stagnant core or eye of the vortex created by such spiral coolant flow. However, as indicated previously, such complete coverage of the internal surfaces 16, 36 may significantly alter the mass balance within the turbine component and add significantly to that component's weight. It will be understood that the vanes 7, 8 will add weight whilst in order to accommodate or allow provision of a groove 37 the wall of the turbine component may be thickened in those portions of the turbine component which include the groove 37 and this in turn will add to component weight. Generally, the flow guides, whether they be vanes 7, 8 or grooves 37, will constitute between 10% to 100% of the interior surface circumference of the chamber 3, 23 in repeated cycles of a flow guide entrainment along the length of the cooling chamber.

Where two guide vanes 7, 8 are provided, or a guide groove 37 is specifically configured either side of the injection passages, the vanes 7, 8, or walls of the guide groove, can be parallel or arranged to allow for some lateral divergence. For example, the downstream guide vane 7 or one wall of the groove 37 may be set at an angle of 20° whilst the downstream guide vane 8 or other wall of the groove 37 may be set an angle of 25° to the axis of the cooling chamber or coolant passage as illustrated in FIG. 2A. However, other angular relationships may be provided but typically a minimum of 5° divergence has been found most advantageous.

As indicated previously, in applying these guide vanes the designer of the turbine component will seek to minimise height, circumferential extent and number of vanes in order to minimise parasitic weight and centre of mass shift whilst still achieving significant improvement in heat transfer and cooling of the turbine component.

A number of injection passages are provided for each cooling chamber of a turbine component. Generally, each of these injection passages will have their own flow guide or arrangement whether it be vanes or grooves or a combination. However, dependent upon position of the injection passage within the turbine component the respective flow guides may be differentially configured in order to provide improved heat transfer but minimise parasitic weight gain or imbalance as described previously. One or more guide vanes may be provided which lie in the path of the coolant air flow jet passing through the injection passage. The guide vanes deflect that jet's direction. Placing a guide vane in the injection passage created coolant air flow jet will break it up and degrade cooling performance. Nevertheless, in cases where vanes on each side of the jet are inadequate to direct flow, for example the guide vanes are too short relative to the width of the slot of the injection passage to be effective, there may still be a net benefit in terms of deflecting coolant air flow over a larger surface of the chamber for improved heat transfer and therefore cooling. As indicated previously, it may be possible particularly where it is necessary to minimise parasitic weight to provide a wave guide only on the side of the injection passage such that the injected coolant air jet impinges on that guide without there being another guide vane on the other side to ensure entrainment into the spiral coolant flow direction.

In order to further improve propagation of spiral coolant flow the guide vanes may be aerodynamically shaped. For example, the leading edge of each guide vane adjacent the injection passage may be aligned with the injected coolant jet flow direction as it emerges from the passage and then turned so that the trailing edge of the guide vane is at the required angle to perform spiral flow propagation into a vortex or corkscrew progression along the length of the cooling chamber.

Figure 2B:
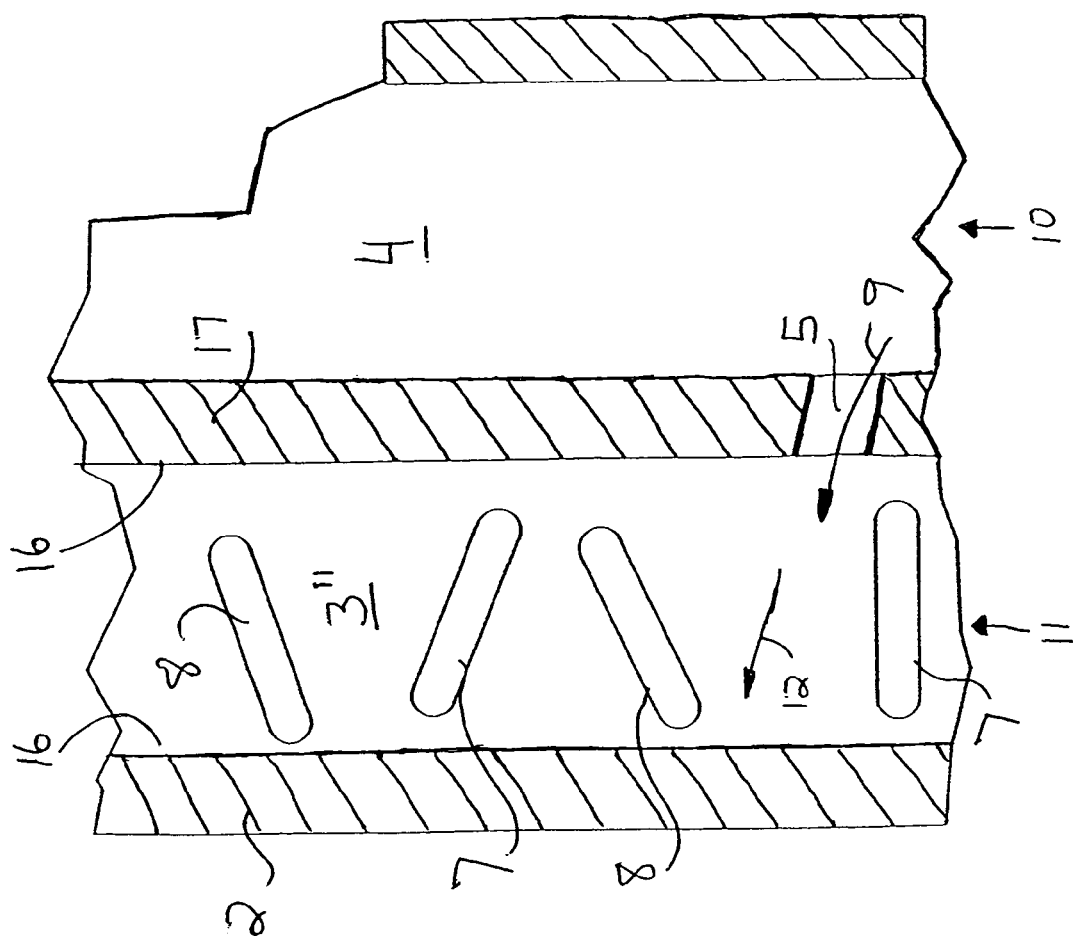
FIG. 2B is a schematic plan view of the embodiment illustrated in FIG. 2 operating in a third configuration.

As indicated above, with respect to the second embodiment of the invention the flow guide for each injection passage can be provided by a spiral groove in the wall of the cooling chamber. Generally, the initial height of the groove will be the same as the slot which forms the injection passage to the cooling chamber. The side walls of the groove, as with guide vanes described previously, will be angled to the circumferential in order to create the desired spiral flow direction. The height of the groove gradually tapers to zero as it extends away from the injection passage and follows the circumference of the cooling chamber wall. Generally, the extent of the groove about the circumference within the chamber will depend upon acceptability of changes in weight and weight distribution within the turbine component. The limits of angles and the circumferential extent of the groove will be substantially as those described previously with respect to guide vanes.

Where possible or desirable the flow guides 7, 8 may be adjustable in terms of angular presentation, height relative to the slot which forms the injection passage and the extent of coverage of the internal surface of the cooling chamber 3" by the flow guides 7, 8 as shown in FIG. 2B. Such adjustment may be through change in dimensions as a result of co-efficient of expansion changes through elevated temperatures.

The guide vanes or side walls of the guide groove may be shaped in order to facilitate flow guiding. Thus, upper portions of the guide vanes or walls of the guide grooves may include a curvature or overhang to facilitate entrainment of the coolant flow into the spiral coolant flow path desired in accordance with the present invention.

In addition to flow guides immediately adjacent the injection passages, further flow guides 7, 8 can be provided upon the inner surface of the cooling chamber 3" which substantially correspond with expected spiral coolant flow pathways as illustrated in FIG. 2B. These additional flow guides will further facilitate entrainment of the coolant flow to the desired spiral pathway as well as increase heat transfer surface area to the coolant in order to increase cooling but as they are discontinuous may provide less parasitic weight gain for similar flow entrainment.

Figure 5:
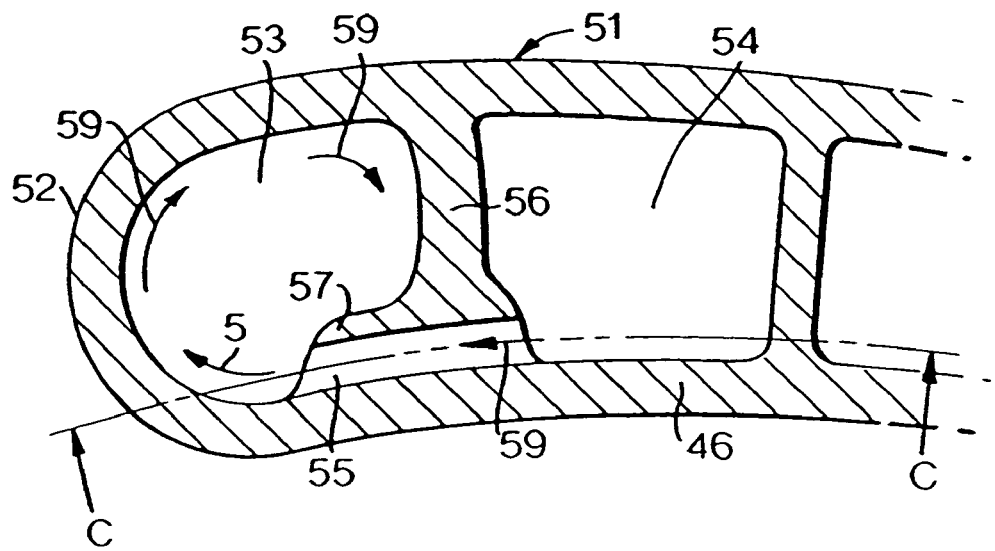
FIG. 5 is a schematic part cross-section of a turbine component in accordance with a third embodiment of the invention.
Figure 6:
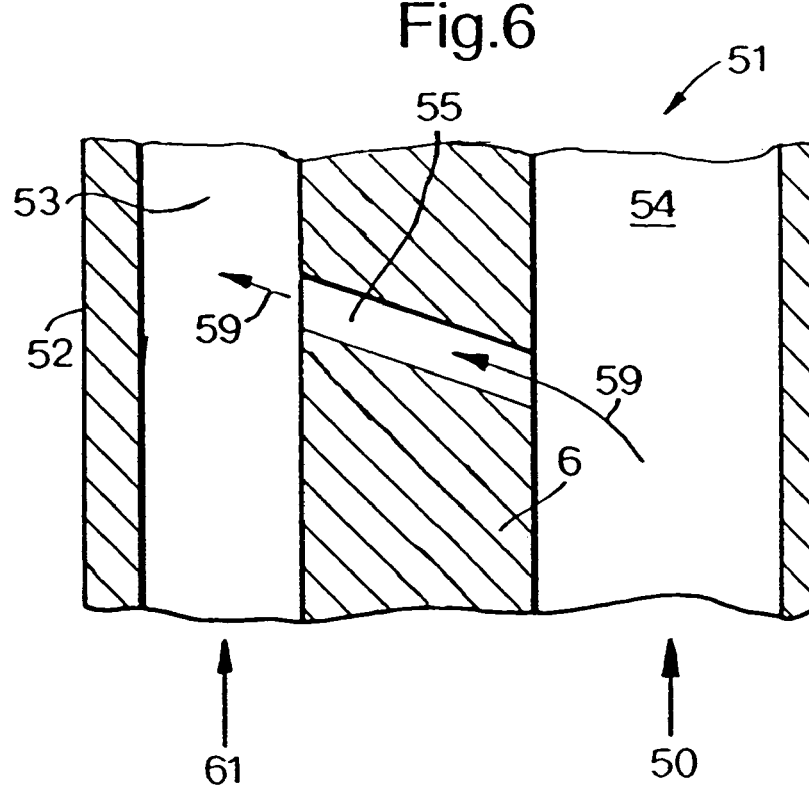
FIG. 6 is a schematic part plan cross-section of the component depicted in FIG. 5 in the direction C—C.

FIGS. 5, 6 and 8 illustrate a third embodiment of the present invention. As discussed previously, in order to avoid excessive weight internal walls 56 of a turbine blade 51 will generally be too thin to provide sufficient width for practical entrainment and angling of an injection passage to cause entrainment of a coolant airflow. In the embodiment depicted in FIGS. 5 and 6, a proportion 57 of the internal wall 56 is thickened such that an injection passage 55 has sufficient length and diameter in order to guide and entrain an airflow shown by arrowheads 59 into a vortex cooling chamber 53 adjacent a leading edge 52 of the blade 51. As only a proportion 57 of the wall 56 is thickened relative weight gain is limited and will be acceptable in view of the improved performance provided. It will also be understood that the thickening of the portion 57 may only be about the injection passage 55 and so as shown by line 58 in FIG. 8, the proportion 57 may return to the normal wall 56 thickness on either side of the injection passage 55 again reducing weight gain caused by the elongate injection passage 55 in order to create entrainment of the coolant airflow 59 through the passage 55 to facilitate spiral coolant flow within the chamber 53.

As described previously, a coolant airflow in the direction of arrowhead 50 will pass through a supply chamber or passage 54 such that a coolant airflow 59 is drawn from that flow 50 through the injection passage 55 into the chamber 53. That coolant flow 59 will be entrained and guided by the passage 55 in order to achieve, normally in association with guides or grooves not shown but as described previously with respect to the first and second embodiments of the invention, a spiral flow in the direction 61 along the chamber 53. Such spiral flow increases the flow to chamber 53 surface contact and so the efficiency of cooling provided by that coolant airflow. The supply chamber or passage 54 is defined by wall sections 46 and 56 such that as the blade 51 is rotated there is a radial coolant airflow in the direction 50 as described previously.

As described previously, it is essential that weight gain is minimised due to the thickening portion 57 added to the internal wall 56 in order to define a longer injection passage 55. Clearly, it is also necessary to ensure that the blade 51 also retains mechanical integrity. In such circumstances, the third embodiment depicted in FIGS. 5 and 6 will normally be combined with guides or grooves as described with respect to the first and second embodiments in FIGS. 1 to 4 in order that the combination provides better entrainment and guidance of the coolant airflow in a spiral path within a chamber for greater cooling efficiency.

Coolant which passes through the cooling chamber along the spiral path will be exhausted in accordance with known principles. Thus, this warmed coolant air will be presented through apertures in the surface of the turbine component in order to provide external cooling of the turbine component. Alternatively or additionally, the warmed coolant may be withdrawn through an exhaust passage associated with a flow guide similar to that described previously and a pressure differential drawing the warmed coolant from the cooling chamber. This exhaust passage may be a hole at the end of the cooling chamber through which warmed coolant air is exhausted.

In order to facilitate vortex strength in a spiral flow path the cooling chamber may be tapered from the injection end towards the exhaust end of the cooling chamber. For example, the wall of the vortex cooling chamber 53 illustrated in FIG. 8 may taper as shown by diverging lines 62. Other shapes of the cooling chamber are possible in order to improve the vortex strength as the coolant flows along the spiral flow path through the cooling chamber.

The cooling chamber itself may have a circular or other shaped cross-section dependent upon the position of the chamber in the turbine component. Thus, the cooling chamber and coolant supply passage could be switched in the embodiments described or another configuration provided with the cooling chamber and supply passage deeper within the blade structure.

Normally, a number of injection passages and flow guides will be provided for each cooling chamber. The positioning of these injection passages and flow guides may be specifically determined to provide a desired operational temperature profile for the turbine component or increased cooling at hotter in services parts of the component.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A turbine component comprising a coolant passage and a cooling chamber connected by an injection passage, the cooling chamber having a wall surface and further including flow guide means associated with and provided immediately adjacent to the injection passage to cause flow in a spiral coolant flow path within the chamber.

2. A component as claimed as claimed in claim 1 wherein the spiral coolant flow path is adjacent to said wall surface of said cooling chamber.

3. A turbine component as claimed in claim 1 wherein the spiral coolant flow path is configured such that the injection passage is at an angle with the flow guide means to ensure limited path flow impingement between coolant flows within the cooling chamber.

4. A turbine component as claimed in claim 1, wherein the flow guide means is raised above the wall surface of the cooling chamber.

5. A turbine component as claimed in claim 1, wherein the flow guide means is formed by grooves formed in the surface of the chamber.

6. A turbine component as claimed in claim 1 wherein the flow guide means is provided only on the downstream side of the injection passage.

7. A turbine component as claimed in claim 1 wherein the injection passage is angled relative to the coolant passage in order to facilitate coolant flow from that coolant passage in use into the cooling chamber.

8. A turbine component as claimed in claim 1 wherein the flow guide means is cast or moulded with the component on formation of the component.

9. A turbine component as claimed in claim 1 wherein the flow guide means is provided by inserts placed within each cooling chamber during assembly.

10. A turbine component as claimed in claim 9 wherein the inserts are fixed relative to each injection passage.

11. A turbine component as claimed in claim 1 wherein the flow guide means is specifically configured, in terms of angular presentation, height relative to the injection passage and the extent of coverage of the internal surface of the cooling chamber by the flow guide means, to enable an adjustment in the spiral coolant flow path dependent upon component temperature.

12. A turbine component as claimed in claim 1 wherein the flow guide means is angled relative to the injection passage connected to the cooling chamber.

13. A turbine component as claimed in claim 12 wherein the flow guide means is angled between 5 and 45° to the axis of the injection passage.

14. A turbine component as claimed in claim 12 wherein the flow guide means is uniformly angled relative to the axis of the injection passage throughout the turbine component.

15. A turbine component as claimed in claim 1 wherein the flow guide means has a height at least 20% of the width of the injection passage in the direction of the spiral flow path.

16. A turbine component as claimed in claim 1 wherein the flow guide means is formed upon between 10% and 100% of each internal circumference surface path of the cooling chamber, whereby the flow guide means provides a plurality of repeated guide cycles for the coolant flow.

17. A turbine component as claimed in claim 1 wherein the flow guide means is provided on either side of the injection passage.

18. A turbine component as claimed in claim 17 wherein the flow guide means on either side of the injection passage are parallel with respect to each other.

19. A turbine component as claimed in claim 1 wherein the cooling chamber has a tapering cross-section or is otherwise shaped from one end to the other in order to facilitate vortex strength as the coolant flow in the spiral flow path progresses along said chamber.

20. An engine including a turbine component as claimed in claim 1.

21. A turbine component as claimed in claim 1 wherein the flow guide means is formed from materials that adjust the spiral coolant flow path dependent upon component temperature.

22. A turbine component as claimed in claim 1 wherein the flow guide means is specifically configured, in terms of angular presentation, height relative to the injection passage and the extent of coverage of the internal surface of the cooling chamber by the flow guide means, to enable an adjustment in the volume of coolant flow taken from the coolant passage dependent upon component temperature by altering the available cross-sectional area from the injection passage into the cooling chamber.

23. A turbine component as claimed in claim 1 wherein the flow guide means is formed from materials to enable an adjustment in the volume of coolant flow taken from the coolant passage dependent upon component temperature by altering the available cross-sectional area from the injection passage into the cooling chamber.

24. A turbine component comprising a coolant passage and a cooling chamber connected by an injection passage, the cooling chamber including flow guide means associated with the injection passage to cause flow in a spiral coolant flow path within the chamber wherein the flow guide means comprises an extension of the injection passage by thickening a proportion of the wall of the cooling chamber about the injection passage.

25. A turbine component comprising a coolant passage and a cooling chamber connected by an injection passage, the cooling chamber including flow guide means associated with the injection passage to cause flow in a spiral coolant flow path within the chamber wherein the flow guide means is angled relative to the injection passage connected to the cooling chamber wherein the flow guide means is presented at different angles to the respective injection passage at different parts of the cooling chamber to create different spiral coolant flow paths in those parts.

26. A turbine component comprising a coolant passage and a cooling chamber connected by an injection passage, the cooling chamber including flow guide means associated with the injection passage to cause flow in a spiral coolant flow path within the chamber wherein the flow guide means on either side of the injection passage diverge relative to one another.

27. A turbine component as claimed in claim 26 wherein the guide means comprises flow guides on either side of the injection passage which diverge such that one flow guide is at an angle which diverges from the other flow guide by at least 5°.

* * * * *